(12) United States Patent
Husain

(10) Patent No.: US 8,261,613 B2
(45) Date of Patent: Sep. 11, 2012

(54) FUEL SENDER WITH REED SWITCH AND LATCHING MAGNETS

(75) Inventor: M. Kaja Aliar Husain, Ganapathy (IN)

(73) Assignee: Pricol Limited, Tamil Nadu (IN)

(*) Notice: Subject to any disclaimer, the term of this patent is extended or adjusted under 35 U.S.C. 154(b) by 419 days.

(21) Appl. No.: 12/311,870

(22) PCT Filed: Dec. 1, 2006

(86) PCT No.: PCT/IN2006/000473
§ 371 (c)(1),
(2), (4) Date: Aug. 10, 2009

(87) PCT Pub. No.: WO2008/047377
PCT Pub. Date: Apr. 24, 2008

(65) Prior Publication Data
US 2010/0043543 A1    Feb. 25, 2010

(30) Foreign Application Priority Data
Oct. 16, 2006  (IN) ............................. 1904/CHE/2006

(51) Int. Cl.
*G01F 23/00* (2006.01)

(52) U.S. Cl. ....................................... 73/313; 73/290 R

(58) Field of Classification Search .................... 73/313, 73/290 R
See application file for complete search history.

(56) References Cited

U.S. PATENT DOCUMENTS

| | | | |
|---|---|---|---|
| 4,056,979 A * | 11/1977 | Bongort et al. ................. 73/313 |
| 4,064,755 A * | 12/1977 | Bongort et al. ................. 73/313 |
| 5,562,132 A * | 10/1996 | Siegele et al. ................. 141/198 |
| 5,590,695 A * | 1/1997 | Siegele et al. ................... 141/21 |
| 5,607,002 A * | 3/1997 | Siegele et al. ................. 141/198 |
| 5,711,354 A * | 1/1998 | Siegele et al. ................. 141/198 |
| 5,829,303 A * | 11/1998 | Fraser ............................ 73/319 |
| 6,363,785 B1 * | 4/2002 | Senghaas et al. ............... 73/313 |
| 6,571,626 B1 * | 6/2003 | Herford ......................... 73/314 |
| 6,629,627 B1 * | 10/2003 | Siegele et al. ............. 222/464.1 |
| 6,923,057 B2 * | 8/2005 | Sabatino ........................ 73/313 |
| 2005/0109105 A1 * | 5/2005 | Kowalski et al. ............... 73/313 |

* cited by examiner

*Primary Examiner* — Hezron E Williams
*Assistant Examiner* — Rodney T Frank
(74) *Attorney, Agent, or Firm* — Alix, Yale & Ristas, LLP

(57) ABSTRACT

The present invention relates to a fuel sensor adapted for sensing the level of fuel in a vehicle fuel tank and in particular to a fuel sensor adapted to sensing the level of fuel which would be accurate, compact and dragged. The fuel sensor of the invention is further adapted to be readily fitted in the vehicle fuel tank for measuring the fuel level efficiently and reliably. Importantly the fuel sensor is further adapted for operative connection to indicative instrument to facilitate ready and accurate reading of the fuel level in the tank.

16 Claims, 2 Drawing Sheets

FUEL SENDER WITH REED SWITCH AND LATCHING MAGNETS

FIELD OF THE INVENTION

Figure 1:
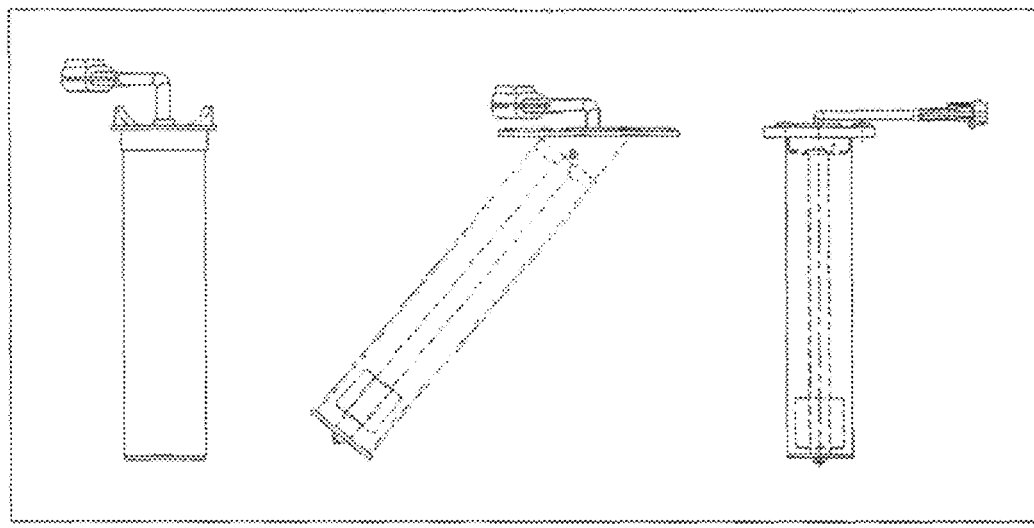

The present invention relates to a fuel sensor adapted for sensing the level of fuel in a vehicle fuel tank and in particular to a fuel sensor adapted to sensing the level of fuel which would be accurate, compact and dragged. The fuel sensor of the invention is further adapted to be readily fitted in the vehicle fuel tank for measuring the fuel level efficiently and reliably. Importantly the fuel sensor is further adapted for operative connection to indicative instrument to facilitate ready and accurate reading of the fuel level in the tank.

BACKGROUND ART

It is well known that fuel level gauges are used to determine the filling height in a fuel tank and from that, in turn, the filling volume of the tank. Such devices are known in a variety of configurations. Fuel level gauges, for instance, for vehicles, are relatively simple in design and have fuel level sensors, for example, in the form of simple float constructions or the like. Over the years, industry has been unable to rely on an economical, maintenance-free and accurate system to measure the level of liquids in tanks. Level measurement systems are used to operate alarm gauges which indicate maximum and minimum liquid levels and control pumps, lights and signals.

Conventional fuel level sensing devices include a pickup tube and a return tube positioned adjacent a float. These devices are fully exposed to the contents of the tank and, in the case of vehicles, are subject to wild fluctuations in the liquid level of the tank due to shaking of the tank as the vehicle drives over rough terrain. These sensing devices are also subject to interference by any debris that might be floating within the tank. Moreover, the exposed pickup and return tubes, as well as the fuel level sensing device may become damaged by contact with the tank opening when the sensing device is installed within the tank.

Numerous design constraints are imposed upon fuel level sensors, wherein the fuel level sensors must be capable of withstanding corrosive environments, as the sensor is at least partially submerged in fuel and various types of fuel additives throughout its operational life. Also, the sensor is frequently subjected to extreme vibration and shock. In addition to these requirements, it is desirable that the sensor be of relatively low cost, compact in size, and fairly easy to manufacture and package.

Fuel level sensors as described in the prior art uses reed switch and are affected by temperature, pressure or depth. In existing fuel level indicator systems utilizing reed switches, a single reed switch is used within a hollow vertical tube and single or multiple ring magnets are used as magnetic elements. Because of the relatively short length over which a ring magnetic can influence the electrical condition of a reed switch, the existing fuel level indicator systems are useful only for measuring liquid level in relatively shallow tanks and for the purpose of indicating when a liquid level passes a predetermined point, such as an empty or dangerously low liquid level in a liquid storage tank.

Furthermore, existing systems having a reed switch utilize magnetic rings or other magnetic elements that set up a uniform magnetic field, the reed switch undergoes numerous changes in electrical condition as the tank in which it is utilized is emptied or filled. This repeated change of condition of the reed switch necessitates an elaborate electrical circuit to make the switch condition meaningful.

Thus, it would be advantageous to provide a fuel level sensor in order to provide an accurate, compact, and rugged fuel level sensor.

OBJECTS OF THE INVENTION

It is thus the basic object of the present invention to provide for a fuel sensor suited for sensing the level of fuel in a vehicle fuel tank which would take care of one or more of the problems/limitations of the conventional prior art as discussed above.

It is another object of the present invention to provide for a Fuel Sensor which is adapted with latching magnets for reed switches activations and involve magnetically activated sensor elements.

It is yet another object of the present invention to provide for a Fuel Sensor which would be adapted such that it can be conveniently mounted with respect to interior of a fuel tank.

It is yet another object of the present invention to provide for a Fuel Sensor involving selectively series connected resistors and magnetically activated switches in order to provide an accurate, compact, and rugged fuel level sensor.

It is another object of the present invention to provide for a Fuel Sensor adapted such that the pattern of resistance is selected to correspond to the contour of the fuel tank and the resistance pattern is coded to represent the volume profile of the fuel tank.

It is a further object of the present invention to provide for a Fuel Sensor involving an indicator for interpreting value of resistance to determine the instantaneous quantity of fuel in the fuel tank.

Yet further object of the present invention is to provide for a Fuel Sensor that facilitates improvements in hysteresis; discontinuity of circuit in operation and cost saving possibilities and which can be adapted by reducing the checkpoints.

It is yet another object of the present invention to provide for a Fuel Sensor which would be simple and user friendly and importantly also compatible for all types of fuel.

It is yet another object of the present invention to provide for a Fuel Sensor which would be adapted to generate the warning signals which get activated based on the fluid level in the vehicle fuel tank.

SUMMARY OF THE INVENTION

Thus according to the basic aspect of the present invention there is provided a fuel sensor adapted for sensing the level of fuel in a vehicle fuel tank comprising:

series connected resistors and magnetically activated reed switches;

a float assembly adapted to rise and fall according to the fuel level to open or close said various magnetically activated reed-switches, said float assembly carrying magnet producing a horizontal magnetic field adapted to activate both magnet and reed-switches from any angular orientation of the float assembly and adapted to provide accurate, compact and rugged fuel level sensing.

Advantageously, the above fuel sensor of the invention comprises latching magnets for reed switches activation and includes magnetically activated sensor elements. The resistors, are fixed along with each reed switch and reed switches are mounted to the surface of an electrical circuit.

In accordance with an aspect of the invention, the fuel sensor comprises a hollow cylindrical body (housing), a magnet carrying float assembly, magnetically latched reed-switches located at different locations in a serial electrical circuit.

A fixed voltage is applied to said sensor with the activation of one of said switches causing said circuit to electrically short at least one of said resistors thus reducing the overall resistance of said circuit and increasing the electrical current through said circuit.

The sensor of the invention is advantageously obtained for mounting internally with respect to the fuel tank with the sensor having a cantilever member from the mounting to a free end, said cantilever member being substantially rigid.

The said magnetically activated switches are spaced such that they are non-overlapping.

The said magnetically activated switches are normally in the "open" or "close" state.

Also, the activating of a reed-switch located at a particular vertical positions along the electrical circuit causes the overall resistance of the circuit to depend upon the position of the float assembly. The pattern of resistance is selected to correspond to the contour of the fuel tank, preferably the resistance pattern is coded to represent the volume profile of the fuel tank. The voltage is applied across the pattern of resistance, the floating magnet and the pattern of resistance cooperate to provide a value of resistance corresponding to the depth of fuel in the fuel tank at the measurement location.

In accordance with an aspect of the invention, the fuel sensor comprises an indicator adapted to interpret the value of resistance to determine the instantaneous quantity of fuel in the fuel tank. The float is guided by a tube adapted to protect from liquid slash.

Advantageously, in the sensor of the invention, the protected embedded printed circuit board placed inside the tube.

The activation of reed switch is based on the principle of biasing a reed switch with another magnet to allow normally closed operation and bringing another magnet of opposite polarity, in close proximity to the magnet/reed switch assembly to open the contacts. A biasing magnet is adapted to allow reed switch operation in the hold area or hysteresis area, there by providing a latching type. To switch from bi-stable state to bi-stable state the operating magnet's polarity or direction is reversed.

In accordance with yet further aspect of the invention, the fuel sensor comprises means to generate warning signals based on the fluid level in the vehicle fuel tank.

It is thus possible by way of possible fuel sensor of the invention to sense the fuel level in the vehicle fuel tank and importantly avoid the complexities of the conventional reed switch based fuel sensors which are usually effected by temperature, pressure for depth.

Importantly the fuel sensor of the invention avoids the limitation of the conventional single reed switch based sensors for measuring liquid level in relatively shallow tanks or for indicating liquid level when it passes a predetermined point such as an empty or dangerously low liquid level in a liquid storage tank and provide for more flexible and reliable sensing of fuel level in variety of fuel tanks of vehicles.

Moreover the fuel sensor of the invention avoids any complex or elaborate electrical circuit and yet achieves the required purpose and reliability to sense the fuel level in a vehicle fuel tank. Importantly the fuel level sensor by way of the above selective operative features achieves an accurate, compact and dragged fuel level sensing.

As also apparent from the above the fuel sensor of the invention is specifically adapted with latching magnets for reed switch activation and involves magnetically activated sensor elements.

The sensor involves resisters, which are fixed along with each reed switch and the reed switches in turn are mounted to the surface of an electrical circuit.

The fuel sensor is adapted for effective mounting in the interior of the fuel tank. The patter of resistance used in the sensor is selectively provided to correspond to the contour of the fuel tank and the resistance pattern is thus coded to represent the volume profile of the fuel tank.

The fuel sensor of the invention is further directed to facilitate improvements in hysteresis, discontinuity of circuit in operation and cost saving possibilities by possible reduction in the check points.

The float guide used in the sensor is preferably guided by a tube which protects the same from any liquid slash. The provision of such float guided by a tube is directed for smooth functioning since the float and maintained undisturbed by the fuel slash.

The fuel sensor in accordance with a further aspect of the invention provides for embedded printed circuit board which are suitably placed inside the tube. The boards are further supported with protective disposition to avoid reaction with fuel.

According to yet further aspect of the invention the fuel sensor is adapted such that to make it user friendly and for better end user satisfaction providing for warning signals to be activated based on the fluid level in the vehicle fuel tank.

The details of the invention and in particular of the fuel sensor of the invention, its objects and advantages are explained hereunder in greater detail in relation to non limiting exemplary illustrations of the fuel sensor of the invention as per the following accompanying figures:

BRIEF DESCRIPTION OF THE ACCOMPANYING FIGURES

Figure 2:
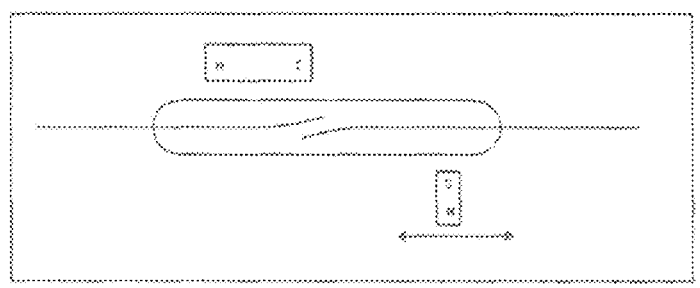
Figure 3:
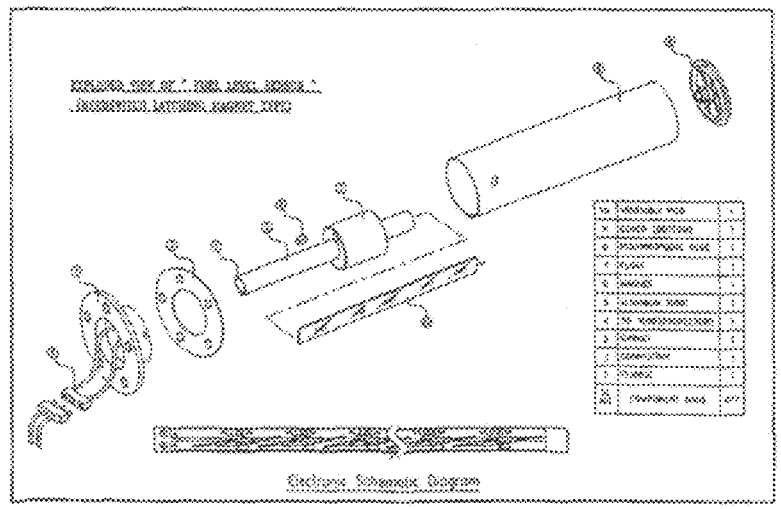

FIG. 1: Illustrates the angle of inclination of the fuel sensor in accordance of the present invention;

FIG. 2: Illustrates the movement of the magnets in the reed switch arrangement used in the fuel sensor of the invention;

FIG. 3: Illustrates an exploded view of the fuel level sensor in accordance to the present invention; and FIG. 4: Illustrates the PCB assembly used in the fuel sensor of present invention.

DETAILED DESCRIPTION OF THE ACCOMPANYING FIGURES

Reference is first invited to accompanying FIG. 1 which illustrates the angle of inclination of the sensor in accordance with the present invention. FIG. 2 illustrates the principle of activation of the reed switch used in the fuel sensor of the invention. Importantly, in the above sensor of the invention a float fixed with a magnet is used to activate a reed switch arrangement. In particular, the activation of the reed switch is based on the principle of biasing a reed switch with another magnet which allow normally closed operation while brining another magnet of opposite polarity in close proximity to the magnet/reed switch assembly is adapted to open the contact. A biasing magnet will allow the reed switch operation in the hold area or hysteresis area, thereby creating a latching sensor. The exact placement of the biasing magnet and the operating magnet is selectively determined. The details of the arrangement of the sensor assembly are discussed hereunder in relation to FIGS. 3 and 4.

FIG. 3 is an exploded view of the fuel level sensor in accordance with the present invention. As clearly represented in said figure the sensor basically involves float (7) arranged with respect to a PP tube (4) with an aluminum tube (5) and a magnet (6). The assembly PCB is indicated by reference (10). The above components are housed within a polypropylene tube (8) which is then cover at one end with the bottom cover (9) and at the other end with the connector (2) including the gasket (3) and with the flange 1.

Figure 4:
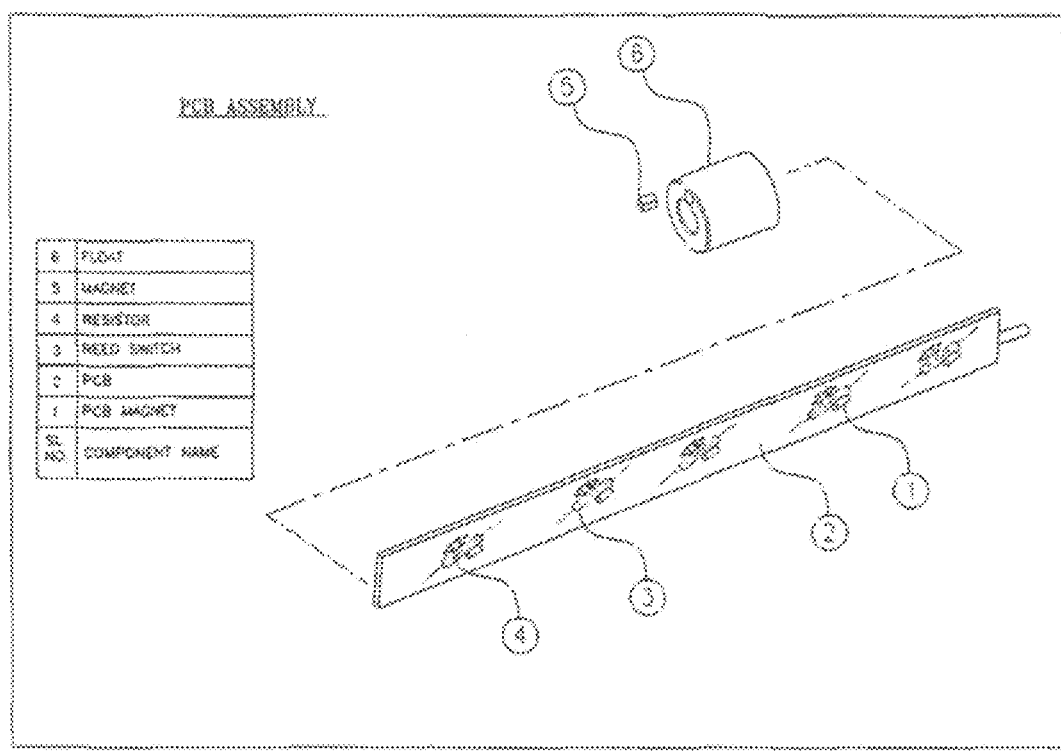

Reference is now invited to accompanying FIG. 4 which illustrates in greater detail the PCB assembly used in the fuel sensor of the invention. The figure further illustrates the provision of resistors (4) which are fixed along with each reed switch (3) and the PCB magnet (1) which are mounted to the surface of the electrical circuit. In particular, the mutually operative components are further illustrated comprising the float (6) and the magnet (5). The mounting cap is preferably made out of reinforced plastics and compatible for all types of fuel. The float is guided by a tube, which will protect from liquid slash. The intention will be smooth, as the float is not disturbed by the fuel slash.

Advantageously, the embedded printed circuit board is placed inside the tube. These boards are supported with protective placed to avoid reaction with fuel.

The above fuel sensor of the invention is thus directed to serve for sensing the level of fuel in a vehicle fuel tank by over coming many of the disadvantages and limitations of the prior art devices. Importantly, the Fuel Sensor is adapted with latching magnets for reed switches activations and magnetically activated sensor elements.

As illustrated in the figures, the resistors, are fixed along with each reed switch and reed switches are mounted to the surface of said electrical circuit. Advantageously, the sensor involves the hollow cylindrical body (housing), a magnet carrying float assembly, magnetically latched reed-switches located at different locations in a serial electrical circuit.

The Fuel Sensor utilize series connected resistors and magnetically activated switches in order to provide an accurate, compact, and rugged fuel level sensor. Preferably, the said magnetically activated switches are spaced such that they are non-overlapping. The said magnetically activated switches are normally in the "open" or "close" state.

The float assembly rises and falls according to the fuel level to open or close various magnetically activated reed-switches. Also, the float assembly carries magnet producing a horizontal magnetic field that can activate both magnet and reed-switch from any angular orientation of the float assembly. The floating magnet and the pattern of resistance cooperate to provide a value of resistance corresponding to the depth of fuel in the fuel tank at the measurement location.

Thus the activating a reed-switch located at a particular vertical positions along the electrical circuit causes the overall resistance of the circuit to depend upon the position of the float assembly. The pattern of resistance is selected to correspond to the contour of the fuel tank. Thus, the resistance pattern is coded to represent the volume profile of the fuel tank. The voltage is applied across the pattern of resistance.

A fixed voltage is applied to said sensor and activation of one of said switches causes said circuit to electrically short at least one of said resistors thus reducing the overall resistance of said circuit and increasing the electrical current through said circuit. The float assembly rises and falls according to the fuel level to open or close various magnetically activated reed-switches.

Preferably, the fuel tank includes an interior mounting to which the fuel sensor is affixed. The fuel sensor has a cantilever member from the mounting to a free end. The cantilever member is substantially rigid.

In accordance with an aspect of the invention, the fuel sensor includes an indicator adapted to interpret the value of resistance to determine the instantaneous quantity of fuel in the fuel tank.

Importantly, the above Fuel Sensor facilitates improvements in hysteresis; discontinuity of circuit in operation and cost saving possibilities can be adopted by reducing the checkpoints. Advantageously also, the fuel sensor can be adapted to generate the warning signals which get activated based on the fluid level in the vehicle fuel tank.

I claim:

1. A fuel sensor adapted for sensing the level of fuel in a vehicle fuel tank comprising:
    a hollow cylindrical housing having
        (a) plurality of spaced apart non-overlapping reed switches each magnetically latched to a PCB magnet, located at different locations in a serial electrical circuit such as to favour activation of the reed switches on the principle of biasing a reed switch with a magnet; and
        (b) a float assembly carrying an operative magnet and adapted to rise and fall according to the fuel level;
    such that said float assembly carrying the operating magnet produces a horizontal magnetic field to activate said reed-switches having biasing magnets from any angular orientation of the float assembly and adapted to provide accurate, compact and rugged fuel level sensing.

2. A fuel sensor according to claim 1, wherein the latched reed switches comprise magnetically activated sensor elements.

3. A fuel sensor according to claim 2 comprising of resistors fixed along with each reed switch and reed switches are mounted to the surface of an electrical circuit.

4. A fuel sensor according to claim 3 wherein a fixed voltage is applied to said sensor with the activation of one of said switches causing said circuit to electrically close at least one of said resistors thus reducing the overall resistance of said circuit and increasing the electrical current through said circuit.

5. A fuel sensor according to claim 4 adapted for mounting internally with respect to the fuel tank with the sensor having a cantilever member from the mounting to a free end, said cantilever member being substantially rigid.

6. A fuel sensor according to claim 5 wherein the said magnetically activated switches are normally in the "open" or "close" state.

7. A fuel sensor according to claim 6 wherein activating a reed-switch located at a particular vertical positions along the electrical circuit causes the overall resistance of the circuit to depend upon the position of the float assembly.

8. A fuel sensor according to claim 7 wherein individual resistors optionally vary in resistance and are arranged with the reed switches in a sequential order to effect a pattern of resistance and said pattern is selected to correspond to the contour of the fuel tank, preferably the resistance pattern is coded to represent the volume profile of the fuel tank.

9. A fuel sensor according to claim to 8 adapted such that the voltage is applied across the pattern of resistance, the floating magnet and the pattern of resistance cooperate to provide a value of resistance corresponding to the depth of fuel in the fuel tank at the measurement location.

10. A fuel sensor according to claim to 9 comprising an indicator adapted to interpret the value of resistance to determine the instantaneous quantity of fuel in the fuel tank.

11. A fuel sensor according to claim to 10 wherein the float is guided by a tube adapted to protect from liquid slash.

12. A fuel sensor according to claim 11 comprising protected embedded printed circuit boards placed inside the tube.

13. A fuel sensor according to claim to 12 wherein the activation of reed switch is based on the principle of biasing a reed switch with another magnet to allow normally closed operation and bringing another magnet of opposite polarity, in close proximity to the magnet/reed switch assembly to open the contacts.

14. A fuel sensor according to claim to 13 wherein a biasing magnet is adapted to allow reed switch operation in the hold area or hysteresis area, there by providing a latching type.

15. A fuel sensor according to claim 14 wherein to switch from bi-stable state to bi-stable state the operating magnet's polarity or direction is reversed.

16. A fuel sensor according to claim 15 comprising means to generate warning signals based on the fluid level in the vehicle fuel tank.

* * * * *